Oct. 15, 1963 A. E. COHEN 3,107,276
APPARATUS FOR VISUALIZING A NUCLEAR RADIATION SOURCE
Filed Dec. 23, 1960
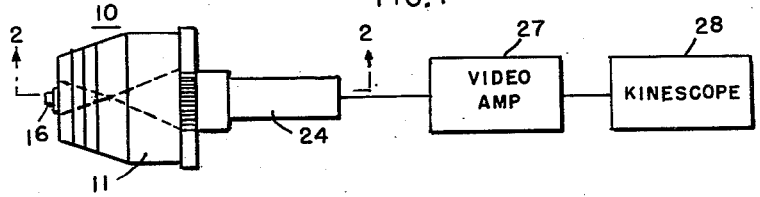
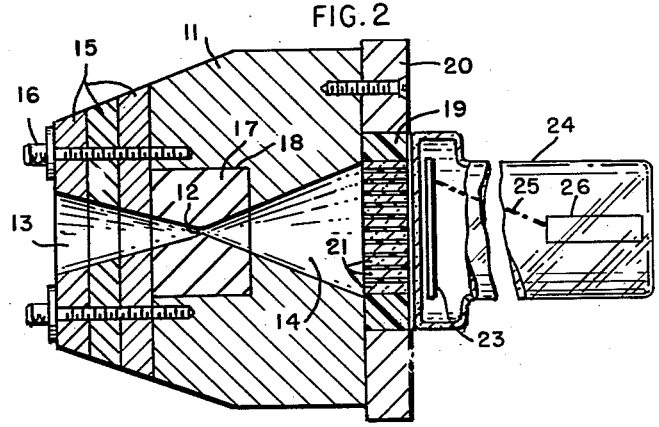
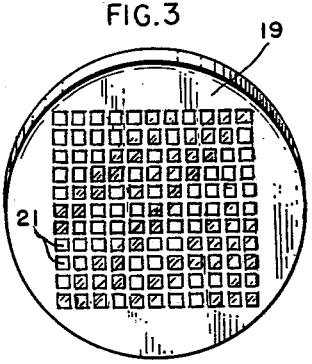
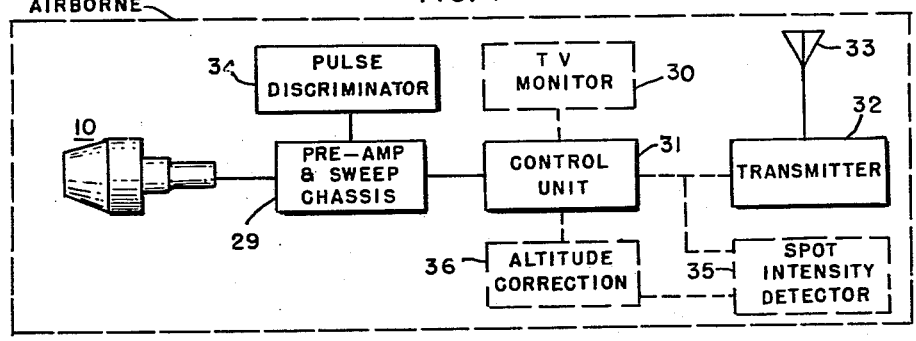
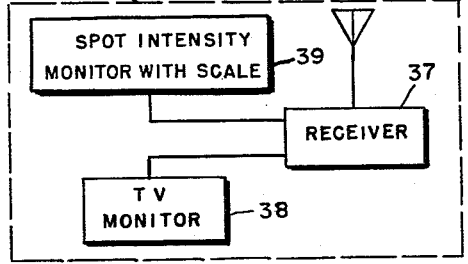
*INVENTOR.*
ABRAHAM E. COHEN
BY Jack H. Linscott
ATTORNEY United States Patent Office 3,107,276
Patented Oct. 15, 1963

3,107,276
APPARATUS FOR VISUALIZING A NUCLEAR RADIATION SOURCE
Abraham E. Cohen, Wanamassa, N.J., assignor to the United States of America as represented by the Secretary of the Army
Filed Dec. 23, 1960, Ser. No. 86,264
10 Claims. (Cl. 178—6.3)
(Granted under Title 35, U.S. Code (1952), sec. 266)

The invention described herein may be manufactured and used by or for the Government for governmental purposes, without the payment of any royalty thereon.

This invention relates to a system for imaging and visualizing a nuclear radiation distribution such as a gamma ray source.

The invention not only delineates the source but provides for measurement of the intensity pattern thereof. The picture produced has good resolution and may be observed equally well locally or at points remote from the camera location. Moreover the picture may be continuously observed for any desired period of time thus indicating changes in intensity and position during the time period.

The lens in the system is of the pinhole type having thick high density walls of material for absorbing the radiation. The radiation passing the pinhole creates the image which falls upon a planar converter element to convert the incident energy to visible energy. Thus the image of the source becomes visible upon the output face of the converter. The converter is optically coupled to the cathode of an image orthicon tube where an electronic pattern is formed corresponding to the image. This pattern is scanned to profide a signal which, by means of video techniques is presented on the face of a kinescope. The video signal is highly amplified thereby increasing the sensitivity of the system. The face of the kinescope may also be photographed for a permanent record.

The system may function as a closed loop television device or may be used to modulate a radio transmitter which in turn may activate a cathode ray display device at a remote point. This latter facility adapts the system for surveying a ground level distributed source such as a bombed area from an aircraft and transmitting the picture to a remote ground level receiver.

It is a primary object of the invention to provide a system having a high order of sensitivity for producing a visible image of a source of nuclear radiation.

A further object of the invention is to provide a system for imaging a source of nuclear radiation wherein the source is distributed over a large area such as an area of terrain which has been contaminated with radioactive particles.

A further object of the invention is to provide a system for imaging sources of radiation of relatively low intensities.

A further object of the invention is to provide a system for imaging a source of radiation wherein the final visible image is presented in normal orientation.

A further object of the invention is to provide a system for imaging a source of radiation and recording the image, the said system having a lens which may be adapted to provide optimum results for differing radiation energies.

A still further object of the invention is to provide a system for visibly presenting radiation patterns at points remote from the camera elements of the system.

Other objects and features of the invention will more fully appear from the following description and will be particularly pointed out in the claims.

To provide a better understanding of the invention particular embodiments thereof will be described and illustrated in the accompanying drawings wherein:

FIG. 1 is a diagrammatic illustration of the system of the invention.

FIG. 2 is detail sectional view of the lens portion of the system showing the means for coupling it to a light producing converter.

FIG. 3 is a face view of the converter.

FIG. 4 is a block diagram of an adaptation of the invention to an aerial survey system.

FIG. 5 is a cross section of a scintillator element.

The embodiment of the invention shown in the drawings is particularly adapted to receiving the intensity pattern radiating from a gamma ray source and is provided with a lens 10 of special construction. Since gamma or other nuclear radiation cannot be refracted in the sense that visible light is refracted, a pinhole type lens must be used. In such a lens a portion of the energy radiated from the source and incident upon the lens passes freely thru the pinhole while that which does not must be stopped or retarded sufficiently to provide a substantial difference between the quantity and energy of those particles that pass the pinhole and those that do not. To accomplish this end a thick wall of material having a high atomic number surrounds the pinhole. The form, composition and thickness of the body of the pinhole structure may vary with the nature of the radiation present. The structure shown may be taken as a typical example suitable for resolving gamma rays. The body 11 is made of iron, is generally cylindrical and has axially aligned conical apertures 13 and 14 whose apex portions meet within the body and form the pinhole 12. A suitable size for the pinhole may be substantially ¼ inch. The desired angle of coverage of the lens is determined by the included angle of the conical apertures. Other dense materials such as lead or the like may be used for the lens body.

Lens wall thickness may be derived from a reduction factor based on absorption in the wall material. This factor may be 100 for X-rays of 220 kev. energy. The factor indicates a 2 inch wall for iron measured perpendicular to the slant edges of the conical apertures of the lens.

When the spectrum of the incident energy is changed it is desirable to vary the wall thickness of the lens body to improve resolution in the image. To accomplish this one or both ends of the lens body is lengthened. As shown the incident end is provided with a plurality of iron discs 15 which are secured in place by screws 16 or in any desired manner. By adding or removing these discs the path of penetration of the radiation is adjusted to provide good resolution in the image. The discs have apertures therein coinciding with and acting to extend the conical cavity 13.

Despite the heavy shielding some of the high energy particles will pass therethru and retain sufficient energy to degrade the image. It becomes desirable therefore to make the shielding as effective as possible. The effective resolution of the lens may be increased to some extent by forming the pinhole in dense materials such as lead, gold, platinum, tungsten, uranium or the like.

A practical means for accomplishing this improvement is to form the pinhole in a relatively small cylinder 17 of the dense material such as gold and insert it in an axial aperture 18 in the body of the lens. Conical apertures coinciding with those in the lens body are formed in the cylinder 17. The cylinder 17 may be held in position in any desired manner. The structure of the body 11 may be such that the inner one of the discs 15 engages the incident end of the cylinders 17 acting to clamp it in place.

Pinholes of various sizes have been used ranging from ⅛ inch to ¼ inch or more in diameter. The smaller sizes produce better definition in the image but reduce the sensitivity of the system. It is also possible to construct a pinhole which is adjustable in diameter by providing coacting movable elements which act as an iris.

The lens above described produces an image of good quality consisting of gamma rays or other radiant energy. This image is impressed upon a converter element 19 secured to the back face of the lens which converts the gamma rays or other energy to light rays. If a larger image is desired the converter may be moved farther away from the lens.

The converter is made up of a large number of elements 21 which are received in apertures in a plate of bakelite, plastic or similar material. The apertures may be square, round, or of other suitable shape. In the arrangement shown in the drawings the apertures are square and closely spaced to form a 2 inch by 2 inch square mosaic with eleven apertures on a side. Other arrangements may be made. The bakelite plate is one centimeter thick and each aperture is ⅛ inch square. Each element 21 is therefore ⅛ inch in cross section, 1 centimeter long and oriented lengthwise of and parallel to the lens axis.

The elements 21 are made of a scintillating plastic phosphor such as (terphenyl in polystyrene) manufactured by Nuclear Enterprises Ltd. Winnipeg, Canada. Its sensitivity to radiation such as gamma rays is 70% that of anthracene.. Other suitable scintillating materials such as sodium iodide may be used. Each element is coated on all sides except its output and face with an opaque layer 40 of titanium dioxide which increases the light output thereof by reflecting back into the scintillating material the light created therein which would otherwise escape and be dissipated. The elongation of the elements 21 increases the quantity of light flux made available and helps to collimate the light energy up to the resolution limits of the light image produced by the converter.

The photon energy induced in the scintillating material is transmitted directly to the cathode screen 23 of an orthicon tube 24 or equivalent tube type. Close optical coupling is realized between the converter and the cathode of the tube by the use of optical coupling fluid.

It is desirable to provide an orthicon tube such as that shown in FIG. 2 wherein the cathode screen is located close to or in contact with the envelope of the tube and wherein intensifying elements provide high gain for the tube. The light output from the converter impinges upon the cathode screen 23 which is provided with a photoactive mosaic layer having electron storage capacity. The photoelectric image thus created is scanned by the electron beam 25 of the orthicon. The orthicon is provided with an electron gun 26 and suitable deflecting electrodes not shown. Power supplies not shown are also provided to activate the tube.

The scanning operation above described developes a modulated output signal which is highly amplified in a video amplifier 27 and thence is conducted to a kinescope monitor 28 wherein a high quality image is displayed upon its screen.

A feature of the invention resides in providing a cathode for the tube 24 having a coating possessing substantial electron storage capacity. This storage facility is used to provide increased output from the overall system. To do this the normal scanning rate which may be 60 cycles per second is reduced, for example, to 30 cycles per second. This decreased scanning rate results in longer exposure of the photoactive material to the photon energy and thus provides increased output signals when the mosaic screen is scanned.

The above system will function with some increases in sensitivity to X-rays when a calcium tungstate intensifier screen is used as the converter. When using this intensifier screen the sensitivity of the system produces a discernable image with an input energy of 1 to 2 roentgens per hour.

The usefulness of the system of the invention may be expanded by adapting it to record and measure neutron and alpha ray distributions in addition to X or gamma ray distributions. For example for imaging thermal neutron sources the pinhole body desirably is made of highly hydrogenated material such as paraffin. In this construction the wall thickness is adjusted to offer a one hundredfold decrease in neutron flux.

To change the neutron flux image to light, a special converter is used which is composed of a sandwich consisting of a layer of boron backed by or surrounded by zinc sulphide which provides a light distribution from the ($n_1 \alpha$) reaction. For fast neutron energy suitable wall materials and converters are utilized to provide an optical image.

The effectiveness of the invention is enhanced by its inherent ability to present an erect and normal picture upon the kinescope screen. This ability results from the double inversion which takes place, one inversion at the lens and the second inversion in its video presentation.

The use of a kinescope for presenting the picture provides for further enlarging the scope of the system. By using well known delayed sweep techniques in connection with the kinescope one may view the variation in video level of the input signal as a function of the location of the image on the face of the kinescope screen. In this case the height of the trace on the tube face may be calibrated and read directly in roentgens per unit time. Thus an accurate indication of radiation intensity of any portion of the field surveyed may be obtained.

It should be noted that different types of orthicon tubes may be used in the system. The tube 24 above described is that type which includes signal intensifier elements within its envelope and is known as an intensifier orthicon. Another type known as the image intensifier orthicon may also be used. This latter type contains a photoactive cathode situated in the same relative position as in the tube 24 and a second plate spaced therefrom and parallel thereto. The second plate has a mosaic surface which releases secondary electrons when struck by primary electrons. A focusing means acting between the two plates transfers the electron image upon the photoactive cathode to the second plate where the image is scanned to release secondary electrons. The secondary electron stream thus released constitutes the video signal for transmission to the kinescope. This tube has a relatively high gain and increases the sensitivity of the system.

The system of the invention has valuable application in aerial radiation survey of bombed areas. In this connection the parts of the system for imaging the radiation distribution and developing a video signal representing such distribution are located in an aircraft together with a radio transmitter whose output is modulated by the video signal. As the aircraft surveys the contaminated area a remote radio receiver at ground level then applies the signal to a kinescope.

Such a system is shown in block diagram in FIG. 4, wherein the lens 10, the converter 20, and the orthicon 24 feed a signal containing a record of the survey to a unit 29 having an amplifier for increasing the amplitude of the signal and containing the sweep circuits for the kinescope monitor 30. The output of the unit 29 is conducted to a control or switching unit 31 from where the amplified signal may be fed to various operating units to be described.

From the control unit 31 the signal is fed to the transmitter 32 and is radiated from the antenna 33. Additional units are provided to promote greater facility in obtaining specific information from the signal. A pulse discriminator 34 is connected to the amplifier unit 29 and a TV monitor is connected to the control unit 31, The unit 34 provides for selection of the range of intensities it is desired to investigate and pass on to the transmitter. The monitor provides a picture of the intensity distribution for observation by the pilot.

A spot intensity detector 35 is connected to the control 31 and also to the kinescope monitor 30. This unit contains a delayed sweep circuit for close observation and measurement of intensities of an isolated portion of the picture such as that contained in one or more lines of the scanning pattern displayed upon the kinescope.

An altitude correction unit 36 is made connectable to the system thru the control 31 and contains an adjustment for inserting a correction factor in the signal which transforms the signal intensity as received at the aircraft's altitude to that existing at ground level.

At ground level the transmitted signal is received by the receiver 37 and displayed upon the TV monitor 38. In addition a spot intensity monitor 39 similar to the unit 35 is connected to the receiver 37 and the monitor 38. The spot monitor 39 is provided with a calibrated indicator device from which radiation intensities may be read directly in roentgens per hour.

The system above-described may be further expanded to include means for observing the radiation distribution pattern superimposed upon a true video picture of the terrain or other radiation source. To accomplish this an additional conventional television pick-up camera including a light refracting lens may be directed upon the same terrain as that which is viewed by the pinhole camera of the invention. The signal derived from light refracting lens is applied to the monitor unit of the apparatus together with the signal depicting the radiation distribution. The apparatus is then adjusted to superpose the resulting pictures in register upon the monitor screen.

What is claimed is:

1. A nuclear radiation visualizing system comprising imaging lens having a thick wall body portion of radiation absorbent material within which is formed a pinhole lens, a planar converter means upon which the imaged radiation is received, said converter consisting of a large number of individual scintillation elements arranged in a mosaic pattern covering the field of view of the lens, a matrix having open ended cells for receiving and holding said scintillation elements in planar alignment, said matrix being made of a non-scintillating non-metallic optically insulating material, said scintillation elements being thereby spaced from each other by the non-scintillating walls of said cells and acting to produce light photon energy in the presence of the radiation whereby the distributed intensity pattern of the source is made visible upon the converter, an electron tube of the image orthicon type having a photoactive cathode positioned in close optical coupling relation to said converter, means for scanning the full area of said cathode plate and a cathode ray display means having a connection from its input to the output of said orthicon tube.

2. A nuclear radiation visualizing system according to claim 1 and a video amplifier for amplifying the output of said orthicon tube.

3. A nuclear radiation visualizing system comprising a pinhole type lens for imaging the radiation source having a wall composed of material of high atomic number and of a thickness to absorb the major portion of the energy incident upon the lens body and not passing the pinhole said wall having substantially the same thickness at the incident and emitting sides of the pinhole, a planar energy converting means placed in position to receive the imaged radiation, said converter consisting of a mosaic of small individual scintillation elements covering the field of view of the lens operable to produce photon energy in the presence of nuclear radiation, walls of optical insulation between said scintillation elements, an image orthicon tube having a photoactive cathode plate and means for scanning the area of said plate with an electron beam, said orthicon tube being positioned to present its cathode into close proximity to and parallel with the face of said converter, a video amplifier having its input connected to the output of said orthicon tube, and a kinescope type cathode ray display means having a connection from its input to the output of said amplifier.

4. A nuclear radiation visualizing system comprising an imaging lens of the pinhole type having a heavy body portion of material having a high atomic number in which the pinhole is formed, the walls of the body being of a thickness to absorb the major portion of the radiation incident upon the lens body and not passing thru the pinhole, a planar energy converting means situated in position to receive the imaged radiation, said converter being composed of a large number of individual scintillator elements arranged in a mosaic covering the area of the field of view of the lens, said elements being received in a sheet of optically insulating material, said elements having an elongated configuration, their length being related to their cross sectional dimension and being arranged in said sheet with their long dimension parallel to the axis of the lens, an image orthicon type tube having a photoactive cathode plate said tube being positioned with its cathode in close proximity to the output face of said converter, a kinescope type display device, an amplifier connected to the output of said orthicon tube and having its output connected to the input of said kinescope.

5. A nuclear radiation visualizing system according to claim 4 and wherein each scintillation element is surrounded by a thin light reflecting wall except upon its output end face.

6. A nuclear radiation visualizing system comprising a pinhole type lens having a thick wall of radiation absorbing material constituting the body of the lens, said body being at least partially composed of a plurality of superposed individual plates of the same or similar material as that of the body, said plates having apertures therein to permit unobstructed radiation to reach said pinhole, means for detachably securing said plates to the body, a planar converter for converting incident radiation into photon energy, said converter being placed to receive the imaged radiation source, scintillating material on said converter formed into individual elements arranged in a closely spaced mosaic and optically insulated from each other, an image orthicon tube having a photoactive cathode plate, said plate having close optical coupling to said converter, electron beam scanning means for scanning said cathode and a kinescope type cathode ray display means having a connection to the output of said orthicon tube.

7. A nuclear radiation visualizing system according to claim 6 and an amplifier connected between the output of said orthicon tube and said kinescope.

8. A nuclear radiation visualizing system according to claim 3 and pulse discrimination means for selecting pulses indicating a desired range of intensities.

9. A nuclear radiation visualizing system according to claim 8 and delayed sweep circuit means associated with said kinescope display means.

10. A nuclear radiation visualizing system according to claim 9 and a spot intensity measuring means for evaluating individual pulses.

References Cited in the file of this patent

UNITED STATES PATENTS

| | | |
|---|---|---|
| 2,688,095 | Andrews | Aug. 31, 1954 |
| 2,747,131 | Sheldon | May 22, 1956 |
| 2,779,876 | Tobias | Jan. 29, 1957 |
| 2,829,264 | Garrison | Apr. 1, 1958 |
| 2,911,367 | Thayer | July 4, 1961 |
| 2,994,773 | Sternglass | Aug. 1, 1961 |